United States Patent
Zhang et al.

(10) Patent No.: US 10,679,135 B2
(45) Date of Patent: Jun. 9, 2020

(54) PERIODICITY ANALYSIS ON HETEROGENEOUS LOGS

(71) Applicant: NEC Laboratories America, Inc., Princeton, NJ (US)

(72) Inventors: Hui Zhang, Princeton Junction, NJ (US); Haifeng Chen, Old Bridge, NJ (US); Jianwu Xu, Lawrenceville, NJ (US); Kenji Yoshihira, Princeton Junction, NJ (US); Guofei Jiang, Princeton, NJ (US)

(73) Assignee: NEC Corporation (JP)

( * ) Notice: Subject to any disclaimer, the term of this patent is extended or adjusted under 35 U.S.C. 154(b) by 891 days.

(21) Appl. No.: 15/340,255

(22) Filed: Nov. 1, 2016

(65) Prior Publication Data
US 2017/0132523 A1    May 11, 2017

Related U.S. Application Data

(60) Provisional application No. 62/252,685, filed on Nov. 9, 2015.

(51) Int. Cl.
| | |
|---|---|
| G06N 3/08 | (2006.01) |
| H04L 12/26 | (2006.01) |
| G06N 5/04 | (2006.01) |
| G06N 20/00 | (2019.01) |

(52) U.S. Cl.
CPC ............. *G06N 5/047* (2013.01); *G06N 20/00* (2019.01)

(58) Field of Classification Search
CPC ................................ G06N 5/047; G06N 20/00
USPC ...................................................... 706/1–62
See application file for complete search history.

(56) References Cited

U.S. PATENT DOCUMENTS

| | | | | |
|---|---|---|---|---|
| 2009/0228409 A1* | 9/2009 | Eklund | ................. | G06F 11/008 706/12 |
| 2015/0085146 A1* | 3/2015 | Khemkar | ............... | H04N 7/147 348/207.1 |
| 2015/0134733 A1* | 5/2015 | Maturana | ................ | H04L 43/04 709/203 |
| 2016/0034809 A1* | 2/2016 | Trenholm | ............. | G06F 9/5027 706/20 |
| 2016/0103838 A1* | 4/2016 | Sainani | ................. | G06F 3/0488 707/725 |
| 2016/0103883 A1* | 4/2016 | Ramani | ................. | G06Q 10/00 707/725 |

OTHER PUBLICATIONS

Li et al, ePeriodicity: Mining Event Periodicity from Incomplete Observations, DOI 10.1109/TKDE2014.2365801, IEEE Transactions on Knowledge and Data Engineering (2014).

* cited by examiner

*Primary Examiner* — Brandon S Cole
(74) *Attorney, Agent, or Firm* — Joseph Kolodka

(57) ABSTRACT

Systems and methods are disclosed for detecting periodic event behaviors from machine generated logging by: capturing heterogeneous log messages, each log message including a time stamp and text content with one or more fields; recognizing log formats from log messages; transforming the text content into a set of time series data, one time series for each log format; during a training phase, analyzing the set of time series data and building a category model for each periodic event type in heterogeneous logs; and during live operation, applying the category model to a stream of time series data from live heterogeneous log messages and generating a flag on a time series data point violating the category model and generating an alarm report for the corresponding log message.

5 Claims, 10 Drawing Sheets

```
2015/03/12 01:00:00 10.110.114.15 COMMIT
2015/03/12 14:00:00 10.110.114.15 COMMIT
2015/03/13 01:00:00 10.110.114.15 COMMIT
2015/03/13 14:00:00 10.110.114.15 COMMIT
2015/03/14 01:00:00 10.110.114.15 COMMIT
2015/03/14 14:00:00 10.110.114.15 COMMIT
2015/03/15 01:00:00 10.110.114.15 COMMIT
2015/03/15 14:00:00 10.110.114.15 COMMIT
2015/03/16 01:00:00 10.110.114.15 COMMIT
2015/03/16 14:00:00 10.110.114.15 COMMIT
2015/03/17 01:00:00 10.110.114.15 COMMIT
2015/03/17 14:00:00 10.110.114.15 COMMIT
2015/03/18 01:00:00 10.110.114.15 COMMIT
2015/03/18 14:00:00 10.110.114.15 COMMIT
2015/03/19 01:00:00 10.110.114.15 COMMIT
2015/03/19 14:00:00 10.110.114.15 COMMIT
2015/03/20 01:00:00 10.110.114.15 COMMIT
2015/03/20 14:00:00 10.110.114.15 COMMIT
```

An event happening twice a day at 01:00AM and 14:00PM.

```
2015/03/12 01:00:00 10.110.114.15 COMMIT
2015/03/12 14:00:00 10.110.114.15 COMMIT
2015/03/13 01:00:00 10.110.114.15 COMMIT
2015/03/13 14:00:00 10.110.114.15 COMMIT
2015/03/14 01:00:00 10.110.114.15 COMMIT
2015/03/14 14:00:00 10.110.114.15 COMMIT
2015/03/15 01:00:00 10.110.114.15 COMMIT
2015/03/15 14:00:00 10.110.114.15 COMMIT
2015/03/16 01:00:00 10.110.114.15 COMMIT
2015/03/16 14:00:00 10.110.114.15 COMMIT
2015/03/17 01:00:00 10.110.114.15 COMMIT
2015/03/17 14:00:00 10.110.114.15 COMMIT
2015/03/18 01:00:00 10.110.114.15 COMMIT
2015/03/18 14:00:00 10.110.114.15 COMMIT
2015/03/19 01:00:00 10.110.114.15 COMMIT
2015/03/19 14:00:00 10.110.114.15 COMMIT
2015/03/20 01:00:00 10.110.114.15 COMMIT
2015/03/20 14:00:00 10.110.114.15 COMMIT
```
— — — An event happening twice a day at 01:00AM and 14:00PM.

FIG. 1

```
2015/03/12 01:00:00 10.110.114.15 COMMIT
2015/03/12 14:00:00 10.110.114.15 COMMIT
2015/03/13 01:00:00 10.110.114.15 COMMIT
2015/03/13 14:00:00 10.110.114.15 COMMIT
2015/03/14 01:00:00 10.110.114.15 COMMIT
2015/03/14 14:00:00 10.110.114.15 COMMIT
2015/03/15 01:00:00 10.110.114.15 COMMIT
2015/03/15 14:00:00 10.110.114.15 COMMIT
2015/03/16 01:00:00 10.110.114.15 COMMIT
2015/03/16 02:35:50 10.110.114.15 COMMIT
2015/03/16 14:00:00 10.110.114.15 COMMIT
2015/03/17 01:00:00 10.110.114.15 COMMIT
2015/03/17 14:00:00 10.110.114.15 COMMIT
2015/03/18 01:00:00 10.110.114.15 COMMIT
2015/03/18 14:00:00 10.110.114.15 COMMIT

2015/03/19 14:00:00 10.110.114.15 COMMIT
```
— An unexpected event happening at 02:35:50AM on 2015/03/16

— — A missing event at 1:00AM on 2015/03/19

FIG. 2

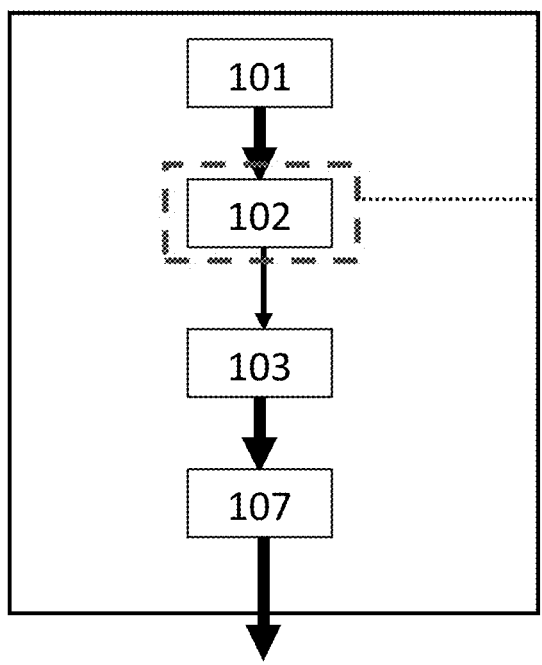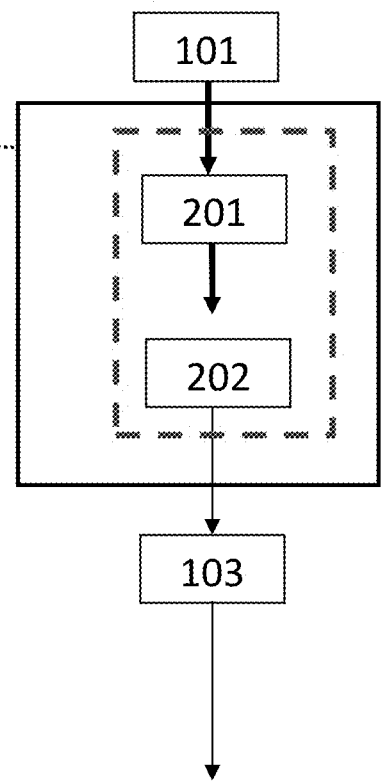
FIG. 4

```
<fitness>0.9629629629629629</fitness>
<Category>
    <value>3.96E7</value>
    <count>13</count>
    <bound>0.0</bound>
</Category>
<Category>
    <value>4.68E7</value>
    <count>14</count>
    <bound>0.0</bound>
</Category>
```

FIG. 7

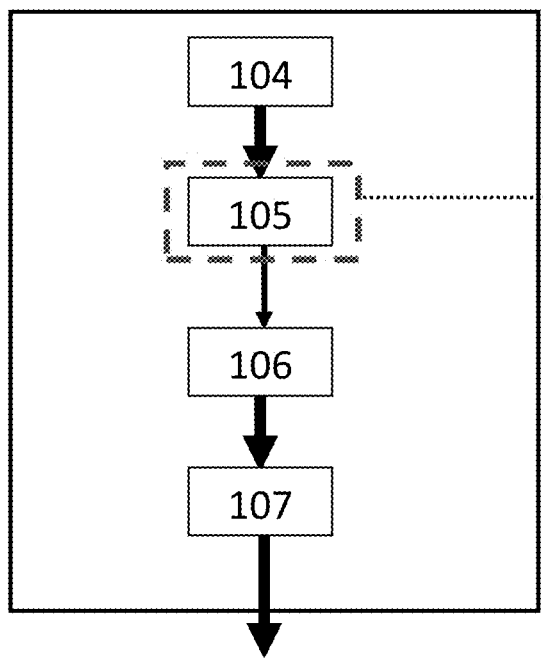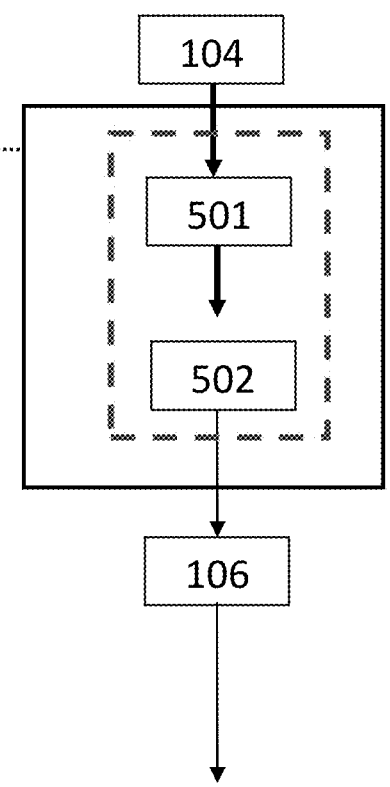
FIG. 8

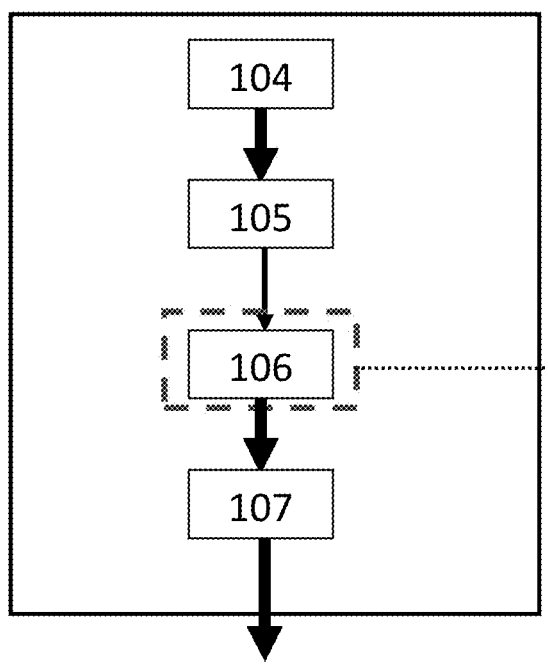
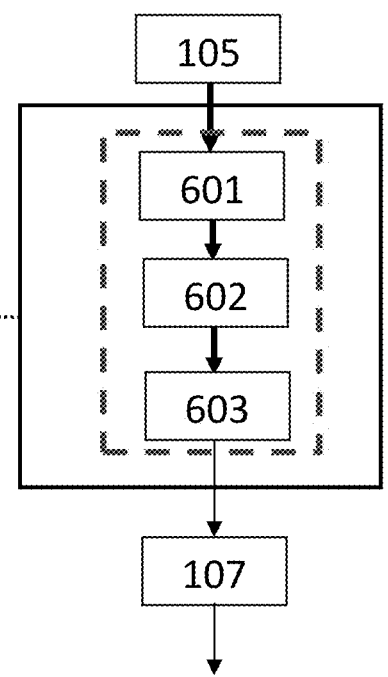
FIG. 9

*Testing....:timediff*
closestCat.value:3.96E7, 5750000.0
Time=1.42648775E12; Category broken; data=5750000.0; residual=null closestCat.value:3.96E7, 4.105E7
Time=1.4265288E12; Category broken; data=4.105E7; residual=null closestCat.value:4.68E7, 8.64E7
Time=1.426788E12; Category broken; data=8.64E7; residual=null

FIG. 10

PERIODICITY ANALYSIS ON HETEROGENEOUS LOGS

BACKGROUND

The system relates to machine determination of periodic event behaviors.

A periodic event is an event that happens regularly over and over again at a fixed interval or a set of fixed intervals (meaning the time between events is substantially the same or among several possible values). Periodicity analysis from the recorded log data is an important task which provides useful insights into the physical events and enables a system to report outliers and predict future behaviors. For example, FIG. 1 shows a set of text logs mined from IT system logs including the periodical pattern of a system event type: it happens twice a day, around 1:00 AM and 14:00 PM. Based on the log event periodicity learnt from FIG. 1, unexpected system behaviors can be detected. For example, FIG. 2 shows the detection of two events that violate the 1:00 AM and 14:00 PM periodicity.

To mine periodicity in an event, systems have to face real-world challenges of inherently complicated periodic behaviors and imperfect data collection problem. Specifically, the hidden temporal periodic behaviors could be oscillating and noisy. Traditional periodicity analysis methods, such as Fourier transform (FFT) and auto-correlation usually require the data to be evenly sampled, that is, there is an observation at every timestamp. Even though some extensions of Fourier transform have been proposed to handle uneven data samples, they are still not applicable to the case with very low sampling rate.

Some methods apply statistical analysis techniques on a single time series of one event type. A probabilistic measure for periodicity, ePeriodicity, has been used to detect periods. This is done by applying different potential periodicity length T to segment the time series into multiple length-T time series, overlay those time series, and report as the periodicity the value T that have the largest clustering behavior measured by an event conditional probability.

BRIEF DESCRIPTION OF THE DRAWINGS

FIG. 1 shows an exemplary periodic event example mined from IT system logs.

FIG. 2 shows exemplary system anomalies detected through the log event periodicity checking.

FIG. 4 shows an exemplary CMBPA logs-to-time series conversion procedure.

FIG. 5 shows an exemplary CMBPA time series data for the logs in FIG. 1.

FIG. 7 shows an exemplary category model output for the logs in FIG. 1.

FIG. 8 shows an exemplary CMBPA logs-to-time series conversion procedure.

FIG. 9 shows an exemplary CMBPA category model testing procedure.

FIG. 10 shows an exemplary Category model testing output for the logs in FIG. 2.

SUMMARY

Systems and methods are disclosed for detecting periodic event behaviors from machine generated logging by: capturing heterogeneous log messages, each log message including a time stamp and text content with one or more fields; transforming the text content into a set of time series data; during a training phase, analyzing the set of time series data and building a category model for each periodic event type in heterogeneous logs; and during live operation, applying the category model to a stream of time series data from live heterogeneous log messages and generating a flag on a time series data point violating the category model and generating corresponding log messages.

In another aspect, a system includes a mechanical actuator; a digitizer coupled to the actuator to log data; a module for detecting periodic event behaviors from machine generated logging, including code for: capturing heterogeneous log messages, each log message including a time stamp and text content with one or more fields; transforming the text content into a set of time series data; during a training phase, analyzing the set of time series data and building a category model for each periodic event type in heterogeneous logs; and during live operation, applying the category model to a stream of time series data from live heterogeneous log messages and generating a flag on a time series data point violating the category model and generating corresponding log messages.

In implementations, the actuator can be a motor or an engine that generates periodic event behaviors that need monitoring for performance, reliability, or maintenance purposes, for example.

Advantages of the system may include one or more of the following. Instead of treating the input data as a single time series, the invention transforms heterogeneous logs into multiple time series, and provides a fast and robust mechanism to discover potentially multiple periods existing in each time series. The periodicity discovery mechanism is based on a category model with the parameters of fitness score, category center and error bounds. The system also provides linear methods to build the category model and test periodicity anomalies based on the category model. The system significantly reduces the complexity of finding statistically periodic event patterns in huge amount of heterogeneous log, even when prior knowledge about the system might not be available. By integrating advanced text mining and time series analysis in a novel way, the present principles construct an automatic periodic pattern mining method for heterogeneous logs in a principled way, and allow faster operation and system updates.

DESCRIPTION

Figure 3:
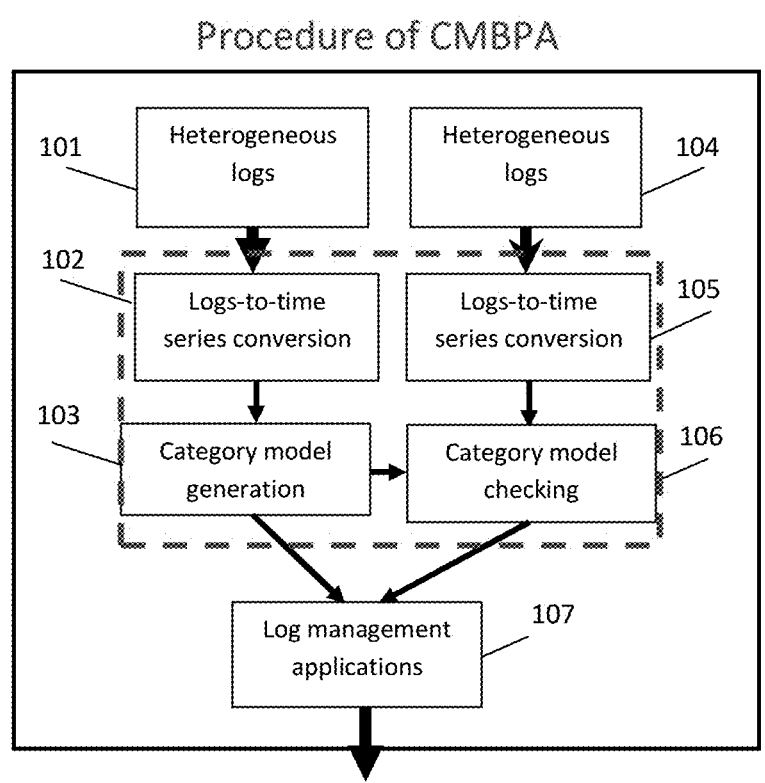
FIG. 3 shows an exemplary Category Model Based Periodicity Analysis (CMBPA) process.

FIG. 3 shows one exemplary process called Category Model Based Periodicity Analysis (CMBPA) for heterogeneous logs. The process operates as follows:

101. Heterogeneous log collection for training. This step takes heterogeneous logs from arbitrary/unknown systems or applications. A log message consists of a time stamp and the text content with one or multiple fields.

102. Logs to time series conversion. This step transforms original training text logs into a set of time series data.

103. Category model generation. This step analyzes the set of time series output by 102, and builds a category model for each periodic event type in heterogeneous logs.

104. Heterogeneous log collection for testing. This step takes heterogeneous logs collected from the same system in 101 for periodicity behavior testing. A log message consists of a time stamp and the text content with one or multiple fields. The testing data may come in one batch as a log file, or come in a stream process.

105. Logs to time series conversion. This step transforms original testing text logs into a set of time series data.

106. Category model checking. This step analyzes the set of time series data output by 102 based on the corresponding category models output by 103, and outputs alarms on any time series data point violating the category model and the corresponding log messages.

107. Log management applications. This step applies a set of management applications onto the heterogeneous logs from 101 based on the category models output by 103, or onto the heterogeneous logs from 104 based on the category model checking output by 106. For example, log based fault management can be applied by discovering missing log messages not shown up on expected time points, or detecting abnormal log messages shown up on unexpected time points output by 106.

FIG. 4 shows the details of the CMBPA logs-to-time series conversion procedure as follows:

201. Log format recognition. A set of log formats matching the training logs can be provided by users directly, or generated automatically by a format recognition procedure on all the heterogeneous logs as below:

201.a—Taking arbitrary heterogeneous logs (step 101), a tokenization is processed is so as to generate semantically meaningful tokens from logs. After the heterogeneous logs are tokenized, a similarity measurement on heterogeneous logs is applied. This similarity measurement leverages both the log layout information and log content information, and it is specially tailored to arbitrary heterogeneous logs. Once the similarities among logs are captured, a log hierarchical clustering algorithm can be applied so as to generate and output a log cluster hierarchy. CMPBA allows users to plug in their favorite hierarchical clustering algorithms.

201.b—Once the log cluster hierarchies are received, within each cluster that on the lowest level in the log cluster hierarchy, the logs are aligned. The log alignment is designed to preserve the unknown layouts of heterogeneous logs so as to help log pattern recognition in the following steps. Once the logs are aligned, log motif discovery is conducted so as to find the most representative layouts and log fields. The following step is pattern recognition from such motifs. First, fields such as time stamps, Internet Protocol (IP) addresses and universal resource locators (URLs) are recognized. Second, other fields which are highly conserved in the logs are recognized and organized in a data structure in the cluster hierarchy. Note that the above log motif discovery and pattern recognition are first done in the lowest level of the log hierarchy. After that, all the information is back propagated up to higher levels in the hierarchy, and fused with their local patterns to provide format pattern representations from the logs.

202. Per-format time series generation. For each unique format in the clustering hierarchy, following is the time series generation procedure on all the heterogeneous logs:

202.a—find all log messages that match the pattern format (e.g., through a regular expression testing).

202.b—order those matched messages based on the time stamps in them. Assume there are K ordered messages, denote their time stamps as $X=\{X1, X2, \ldots, XK\}$.

202.c—output the inter-arrival time series as $Y=\{Y1=X2-X1, Y2=X3-X2, \ldots, YK-1=XK-XK-1\}$.

For example, FIG. 5 shows a part of the time series for the logs in FIG. 1 matched on the log format "{%TIME_STAMP} (%IP_ADDRESS) COMMIT"
Y1=46800000
Y2=39600000
Y3=46800000
Y4=39600000
Y5=46800000
Y6=39600000
Y7=46800000
Y8=39600000
. . .

Figure 6:
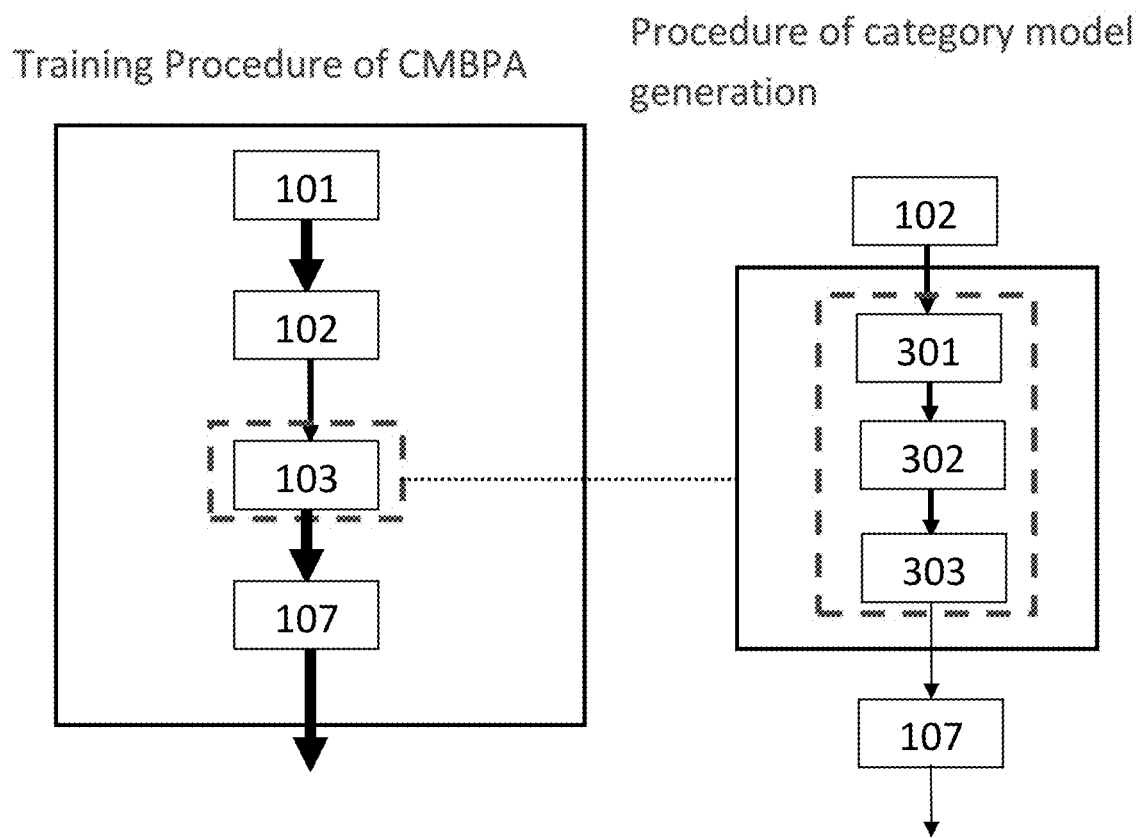
FIG. 6 shows an exemplary CMBPA time series data for the logs in FIG. 1.

FIG. 6 shows the details of the CMBPA category model generation procedure. For each log format Y with the inter-arrival time series $Y=\{Y1, Y2, \ldots, YK-1\}$ output from 202, following is the category model generation procedure to decide if it contains a periodic event pattern, and in case of yes, the detailed periodicity model:

301. estimate categories. counter the appearance times of unique values in the time series Y, sort those unique values in an increasing order, and record them in an ordered list $C_{estimated}=[C_1, C_2, \ldots C_u]$ and $N_{estimated}=[N_1, N_2, \ldots N_u]$, where u is the number of the unique values, and $N_i$ is the appearance time of the unique value $C_i$ in Y.

302. cluster estimated categories. From the estimated category values in $C_{estimated}$, we will cluster them based on their distance given a category distance ratio $\sigma$ (e.g., $\sigma=0.01$).

302.a—calculate the distance of each value in $C_{estimated}$ to its next neighbor in the sorted list: $D_{estimated}=[d_1=|C_2-C_1|, d_2=|C_3-C_2|, \ldots d_{u-1}=|C_u-C_{u-1}|]$. Let $d_{max}=\max\{d_i, 1\le i\le u-1\}$.

302.b—initialize a list $d_{index}=\{\}$. From i=1 to (u-1), if the distance value $d_i$ satisfies that $(d_i/d_{max})\le \sigma$, i is added into the list $D_{index}=D_{index}+\{i\}$.

302.c—if the list $D_{index}$ is empty, there is no category model found for the time series Y.

302.d—if the list $D_{index}$ is not empty, initialize the final category model as a list $C_{final}=\{\}$, and set k=1. From i=1 to u:

302.d.1—if i is not in $D_{index}$ and $C_{final}$, creates a new category list $C'_k=\{C_i\}$; add it into the final category model $C_{final}=C_{final}+\{C'_k\}$, k=k+1;

302.d.2—if i is in $D_{index}$, finds the longest consecutive integer sequence (i, i+1, i+2, ..., i+c) in $D_{index}$, creates a new category list $C'_k=\{C_i, C_{i+1}, \ldots, C_{i+c+1}\}$, and add it into the final category model $C_{final}=C_{final}+\{C'_k\}$, k=k+1.

303. model categories If there is no category model, stops here. Otherwise, for the final category model $C_{final}=\{C'_1, C'_2, \ldots, C'_f\}$, the model parameter (Center $(C'_k)$, Error$(C'_k)$) is calculated for each $C'_k=\{C_i, C_{i+1}, \ldots, C_{i+j}\}$, $1\le k\le F$, and a fitness score is calculated for the whole category model $C_{final}$:

303.a—Center$(C'_k)=C_m$, where m is $\max\{N_m, i\le m\le i+j\}$. i.e., we choose the unique value with the largest appearance time in Y as the cluster center of the category $C'_k$.

303.b—Error$(C'_k)=\max\{|C_m-\text{Center}(C'_k)|, i\le m\le i+j\}$. i.e., we choose the error bound as the largest distance of the unique values in $C'_k$ to its center.

303.c—Size$(C'_k)=\Sigma_{m:i, \ldots, i+j}N_m$; average_size$(C_{final})=$ (K-1)/F; fitness$(C_{final})=\min\{\text{Size}(C'_k), 1\le k\le F\}$average_size$(C_{final})$.

For example, FIG. 7 shows two categories are generated for the logs in FIG. 1: one with the Center value 3.96E7

(11-hour interval) & error bound 0, and another with the Center value 4.68E7 (13-hour interval) & error bound 0; the fitness score for the whole category model is 0.9629629629629629.

FIG. 8 shows the details of the CMBPA logs-to-time series conversion procedure for the testing procedure:

501. Log format selection. From the set of log formats generated in 201, only the formats with category models are selected for the rest of the testing procedure.
502. Per-message time stamp recognition. For each log message i in the testing data,
find the log format $f_i$ for that it matches (e.g., through a regular expression testing), and extract the time stamp $t_i$ for i. If i does not find a matching format, it will be filtered out for the rest of the testing procedure.

FIG. 9 shows the details of the CMBPA category model testing procedure. For each log message i having a matching format fi in 105, following is the category model testing procedure to decide if it violates the periodicity behavior described by fi's category model and an anomaly should be reported:

601. find the category. Let T be the inter-arrival time of log i and the previous log matching format $f_i$. For format $f_i$'s category model $C_f = \{C'_1, C'_2, \ldots, C'_F\}$, find $C'_m$:Center $(C'_m)$=min$\{|T-\text{Center}(C'_j)|, 1 \leq j \leq F\}$.
602. check the error bound. If $|T-\text{Center}(C'_m))|>$Error $(C'_m)$), log message i violates the periodicity behavior described by $f_i$'s category model. Otherwise it does not violate any periodicity behavior.
603. report an anomaly. If log message i violates the periodicity behavior, the category model fitness score is checked; if it is larger than a threshold α (e.g., 0.5), an anomaly will be reported; otherwise, an anomaly will not be reported until κ (e.g., 2) consecutive logs matching format $f_i$ including the log message i violate the periodicity behavior.

FIG. 10 shows the three periodicity anomalies detected from the logs in FIG. 2 based on the periodicity model learnt from the logs in FIG. 1.

Figure 11:
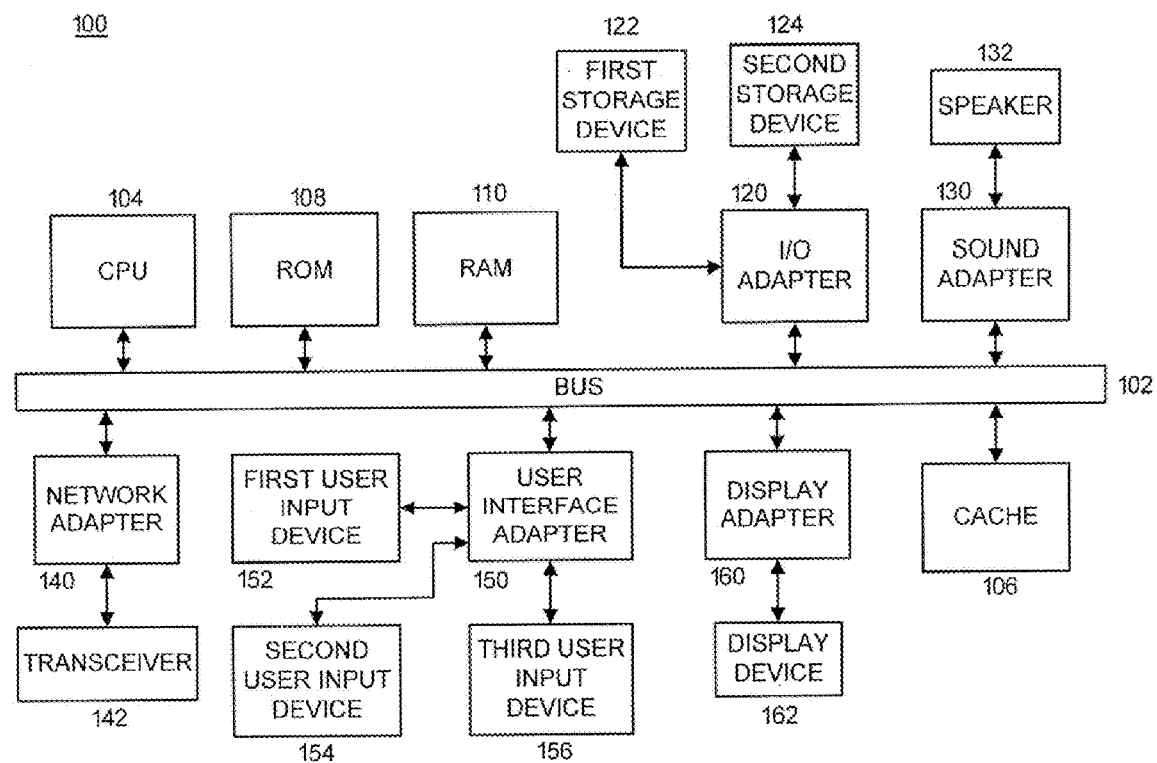
FIG. 11 shows exemplary hardware for FIG. 1.

Referring to the drawings in which like numerals represent the same or similar elements and initially to FIG. 11, a block diagram describing an exemplary processing system 100 to which the present principles may be applied is shown, according to an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to a system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to the system bus 102 by the sound adapter 130. A transceiver 142 is operatively coupled to the system bus 102 by a network adapter 140. A display device 162 is operatively coupled to the system bus 102 by a display adapter 160. A first user input device 152, a second user input device 154, and a third user input device 156 are operatively coupled to the system bus 102 by a user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used while maintaining the spirit of the present principles. The user input devices 152, 154, and 156 can be the same type of user input device or different types of user input devices. The user input devices 152, 154, and 156 are used to input and output information to and from the system 100.

Of course, the processing system 100 may also include other elements (not shown), as readily contemplated by one of skill in the art, as well as omit certain elements. For example, various other input devices and/or output devices can be included in the processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations, can also be utilized as readily appreciated by one of ordinary skill in the art. These and other variations of the processing system 100 are readily contemplated by one of ordinary skill in the art given the teachings of the present principles provided herein.

It should be understood that embodiments described herein may be entirely hardware, or may include both hardware and software elements which includes, but is not limited to, firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor, e.g., a hardware processor, coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention.

Those skilled in the art could implement various other feature combinations without departing from the scope and spirit of the invention.

What is claimed is:

1. A method for detecting periodic event behaviors from machine generated logging, comprising:
   capturing heterogeneous log messages, each log message including a time stamp and text content with one or more fields;
   transforming the text content into a set of time series data;
   during a training phase, analyzing the set of time series data and building a category model for each periodic event type in heterogeneous logs; and
   during live operation, applying the category model to a stream of time series data from live heterogeneous log messages and generating a flag on a time series data point violating the category model and generating an alarm report on the corresponding log message;
   the method comprising order matched messages based on the time stamps and for K ordered messages, marking their time stamps as $X=\{X_1, X_2, \ldots, X_K\}$ and outputting inter-arrival time series as $Y=\{Y_1=X_2-X_1, Y_2=X_3-X_2, \ldots, Y_{K-1}=X_K-X_{K-1}\}$; and
   estimating the categories by counting appearance times of unique values in the time series Y, sort unique values in an increasing order, and recording in an ordered list $C_{estimated}=[C_1, C_2, \ldots C_u]$, and $N_{estimated}=[N_1, N_2, \ldots N_u]$, where u is a number of unique values, and $N_i$ is appearance time of the unique value $C_i$ in Y.

2. The method of claim 1, comprising clusterizing the estimated categories.

3. The method of claim 2, comprising generating a final category model $C_{final}=\{C'_1, C'_2, \ldots, C'_F\}$, determining a model parameter (Center($C'_k$), Error($C'_k$)) for each $C'_k=\{C_i, C_{i+1}, \ldots, C_{i+j}\}$, $1 \leq k \leq F$, and a fitness score for a category model $C_{final}$.

4. The method of claim 3, comprising determining $C'_m$: Center($C'_m$)=min{|T−Center($C'_j$)|, $1 \leq j \leq F$}, where T is an inter-arrival time of log i and a previous log matching format $f_i$ with category model $C_f=\{C'_1, C'_2, \ldots, C'_F\}$.

5. The method of claim 4, comprising determining a periodicity behavior violation if |T−Center($C'_m$)|>Error(C'm)).

* * * * *